United States Patent [19]

Hesse

[11] 4,220,296

[45] Sep. 2, 1980

[54] METHOD FOR GUIDING THE FINAL PHASE OF BALLISTIC MISSILES

[75] Inventor: Klaus Hesse, Holm, Fed. Rep. of Germany

[73] Assignee: LICENTIA Patent-Verwaltungs-G.m.b.H, Frankfurt am Main, Fed. Rep. of Germany

[21] Appl. No.: 848,379

[22] Filed: Nov. 3, 1977

[30] Foreign Application Priority Data

Nov. 3, 1976 [DE] Fed. Rep. of Germany ....... 2650380

[51] Int. Cl.² ............................................... F41G 7/00
[52] U.S. Cl. .................................................. 244/3.14
[58] Field of Search ..................... 244/3.13, 3.14, 3.16

[56] References Cited

U.S. PATENT DOCUMENTS

| 3,567,163 | 3/1971 | Kepp | 244/3.14 |
|---|---|---|---|
| 3,672,607 | 6/1972 | Stauff et al. | 244/3.16 |
| 3,733,133 | 5/1973 | Chapman | 244/3.16 |
| 3,743,217 | 7/1973 | Turck | 244/3.16 |
| 3,807,658 | 4/1974 | Miller, Jr. et al. | 244/3.13 |
| 3,848,830 | 11/1974 | Born | 244/3.16 |

Primary Examiner—Charles T. Jordan
Attorney, Agent, or Firm—Spencer & Kaye

[57] ABSTRACT

A method for guiding the final phase of a ballistic missile wherein the target and the missile are continuously tracked to determine their positions with respect to the missile firing platform; the actual coordinates of the missile position, which are continuously being furnished by the tracking system, are constantly compared with nominal coordinates determined by a fire control computer and the deviation is computed therefrom; a correction signal, as to magnitude and direction of the path of the missile is generated from the deviation and is transmitted to the missile as a wireless, coded signal; and this correction signal, together with measurements for the dynamic flight characteristics are translated in the missile into a triggering pulse to actuate a path correction for the missile.

3 Claims, 5 Drawing Figures

METHOD FOR GUIDING THE FINAL PHASE OF BALLISTIC MISSILES

BACKGROUND OF THE INVENTION

The present invention relates to a method for guiding the final phase of ballistic missiles.

Methods and apparatus for guiding missiles to given targets are known. They can be roughly separated into passive and semiactive methods. In the former methods, a television camera located, for example, in the head of the projectile transmits its picture information via radio to a central station which guides the projectile to the target covered by the television camera by appropriate guiding signals. Reference is made in this connection to a paper by V. K. Zworykin, *Flying Torpedo With An Electric Eye*, RCA Review, September 1946, Vol. III, No. 3, pp 293-302. These methods, in view of the expenditures involved and of their fixed acceleration, are suitable only for larger missiles or those that are not heavily accelerated and for strategic targets such as bridges, rocket launching pads etc. Another known method for providing guidance from the firing system is the so-called beam rider guidance system. (See the periodical "Luftfahrttechnik" [Aeronautics] Vol. 5, No. 2 of Feb. 15, 1959, page 40, center column.) In this method, special projection devices are used to direct a guiding beam, with adjacent lateral warning ranges, in the direction of the nominal position of the flying body, with the warning ranges being coded so that the flying body can itself determine from this code of the warning regions the magnitude and direction of its deviation from the nominal position. The drawback of this method is the quantity of electronic equipment required in the flying body to evaluate the warning signals.

If, however, bombs or artillery projectiles with simple search heads, for example, with four quadrant sensors, are to be used, it is necessary to employ dot targets, i.e., either a heat target with high temperature contrast or an actively illuminated target, for example, by means of a laser target illuminator.

SUMMARY OF THE INVENTION

It is the object of the present invention to provide a method with which it is possible without target illumination and optical equipment being required in the projectile and moreover with electronic equipment that is reduced to a minimum to make a path correction of the projectile.

The above object is achieved according to the present invention by a method for guiding the final phase of a ballistic missile, wherein: a tracking arrangement, which is at least partially automatic, is used for the simultaneous tracking of target location and of missile position with respect to the position of the firing platform for the missile and at least the angular coordinates of the target location are fed to a fire control computer; the actual coordinates of the missile position, which are continuously being furnished by the tracking system, are constantly compared with the nominal, i.e., desired or ideal, coordinates for the missile, which are determined by the fire control computer, and a correction signal is computed for the deviation between the compared coordinates; the correction signal, which has been determined as to magnitude and direction, is transmitted to the missile as a wireless, coded signal; and the signal received by the missile, together with measurements for the dynamic flight characteristics of the missile, are translated into a triggering pulse to actuate a path correction for the missile.

According to a preferred embodiment of the present invention a dual automatic tracking system is utilized for the simultaneous analysis of target location and projectile position with respect to their angular coordinates; the actual coordinates of the projectile position, which are continuously being furnished by the tracking system, are constantly compared with the nominal coordinates determined by the fire control computer, the deviation is determined and a correction signal calculated therefrom; this correction signal, which has been determined as to magnitude and direction, is transmitted to the projectile as a wireless, coded signal; and this latter signal, together with measurements for the dynamic flight characteristics are translated in the missile into a pulse for actuating a path correction for the missile. Thus, according to the invention the large majority of the modifications to be employed, with respect to a conventional ballistic missile or projectile, are made in the firing system itself, and thus in an economical manner. With this guidance system arrangement it is possible to effect a path correction for fast artillery projectiles ($V_0 \sim 3$ Mach) without a search head and without an optical sensor, if it is determined that the projectile would miss the target on its ballistic path.

According to another embodiment of the invention the target location is manually tracked to provide the reference line between the firing system and the target in that an operator, e.g., the gunner, continuously holds e.g., by means of a guide or joy stick, the sighting line of a tracking camera, i.e., (reticle—crossed hairs) on the target while the actual position of the projectile or missile with respect to this reference line is determined automatically by a tracking system which follows the light track of the projectile; the actual coordinates of the missile position which are being furnished continuously by the tracking system, are constantly compared with the nominal coordinates for the missile position as determined by a fire control computer, the deviation determined, and a correction signal computed from the deviation; this correction signal, which has been computed as to magnitude and direction, is transmitted to the projectile as a wireless, coded signal; and the received signal, together with measurements for the dynamic flight characteristics are translated in the missile into a triggering pulse to actuate a path correction for the missile.

DETAILED DESCRIPTION OF THE PREFERRED EMBODIMENTS

Figure 1:
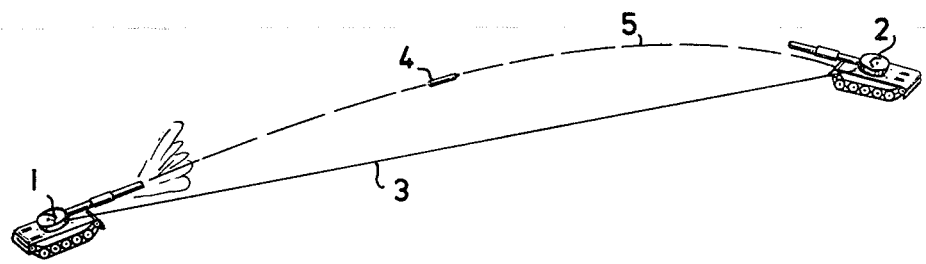
FIG. 1 is a schematic illustration of a combat situation.

In FIG. 1 the attacking vehicle 1 has found a target 2. The sighting line 3 of the camera, e.g., a television camera, in vehicle 1 is directed on the target 2. The projectile 4 fired by vehicle 1 at the target 2 moves on a path 5 shown in dashed lines. Due to external influences, it may happen that the projectile or missile 4 would miss the target 2 if it were to follow its ballistic path 5. The present invention therefore proposes a method of changing the path of the projectile 4 during its flight in order to prevent such a miss.

Figure 2:
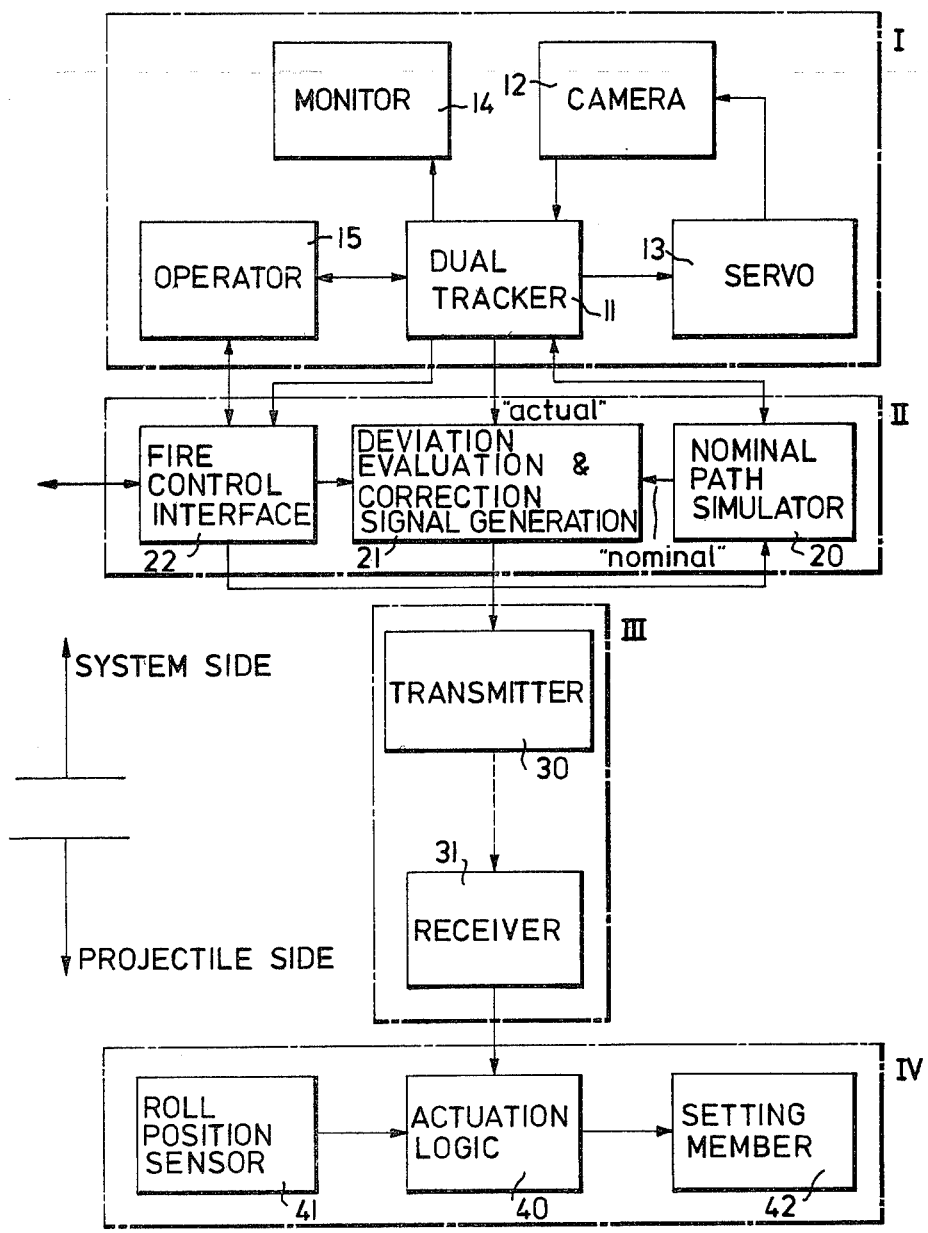
FIG. 2 is a block diagram of the basic apparatus for practicing the method according to the invention.

FIG. 2 shows an arrangement, in a block diagram, for practicing the method according to the invention and includes the following main groups of components which are outlined in dot-dash blocks:

Block I is a special tracking system including a dual tracker 11 with a tracking camera 12 and servo 13, a monitor 14 and an operating device 15. The dual tracker 11 has two independently operating signal evaluation channels of which the first channel corresponds to a standard structure tracker as it is desired for automated combat procedures in the future. This first operating channel of tracker 11 evaluates the scene as observed by the camera 12, determines the position of the target, preferably by means of pattern recognition, and feeds a signal to the servo 13 to position the camera 12 so as to maintain the target in the reticle or cross-hairs of the camera 12. The scene as observed by the camera 12 is also fed to the monitor 14 so that the same can be observed by the gunner or operator of the system.

The dual tracker 11 further includes a second operating channel which evaluates the scene observed by the camera 12, identifies the missile or projectile in the observed scene, preferably by means of peak contrast evaluation, and tracks same. This second evaluation channel determines the deviation of the angular coordinates of successive positions of the missile in the scene and internally evaluates same to guide a second window on the monitor 14 to display same. Additionally the coordinate deviation, provided by this second channel are evaluated externally, as will be discussed below, to determine the difference between the nominal, i.e., the desired or ideal, coordinates and the actual coordinates of the path of the missile or projectile. The coordinate origin for the angular coordinates is the sighting line of the camera 11 since, as mentioned above, it is constantly directed on the target by the tracking system of the first channel.

Block II is an electronic intelligence system including the main function units of a nominal flight path simulater 20, a deviation evaluator and generator 21 for the correction signals, and an interface 22 for a conventional fire control computer (not shown). The components of block II and/or their functions can be included in the control computer if desired. The deviation evaluation and correction signal generator 21 basically receives the signal from the dual tracker 11 corresponding to the actual position of the missile, continuously compares same with the signal corresponding to the nominal position of the missile as provided by the nominal path simulator 20 and, if there is a deviation, generates a correction signal, with respect to magnitude and direction, for the flight path of the missile or projectile. The calculations and signals provided by the units 20 and 21 is, in the illustrated embodiment, under control of the fire control computer via the interface 22.

Block III shows the components for transmitting the correction signal from unit 21 to the projectile or missile. Basically this includes a transmitter 30 of conventional design for coding and transmitting the correction signal to the missile in a wireless manner, e.g., by radio, and a receiver 31 in the projectile for receiving and decoding the correction signal. The point of intersection between the components provided in the system located at the firing platform for the missile or projectile and those in the projectile itself lies between the transmitter 30 and the receiver 31, as shown in FIG. 2.

Finally Block IV shows the components located in the projectile for effecting the path correction. These components include a triggering or actuation logic circuit 40 which is responsive to the correction signal received by the receiver 31 and to a signal from a unit which produces a signal corresponding to a dynamic flight characteristic of the missile, e.g. a roll position sensor 41 as shown, to effect a phase correct actuation of a setting member 42 for altering the flight path of the missile according to the transmitted and received correction signal.

The operation of these main groups of components I through IV will now be explained with the imaginary sequence of a shot.

Once the target 2 (FIG. 1) has been discovered the camera 12 and the gun in vehicle 1 are directed toward this target 2. The first channel of the dual tracker 11 now tracks the target 2 so that the camera 12 constantly has the target 2 in its reticle and transmits the angular coordinate values of the target to the fire control computer via the interface 22. Once the projectile has been fired the computer begins with the constant emission of the nominal path data via the nominal path simulator 20 while the dual tracker 11 keeps its second window in waiting position at the edge of the field of view of the camera 12 until the light track of the projectile can be covered when it appears in the field of view of the camera 12. From now on, the second channel of the dual tracker 11 continuously determines the data for the actual position of the projectile with respect to the target and feeds same to the unit 21 wherein this data is compared with that from the nominal path simulator 20.

It may be advisable under certain circumstances to compute the nominal positions in advance with a series of supporting values and to store them so as to have more time available for the nominal/actual position or coordinate comparison and the calculating steps connected therewith when the projectile comes into the field of view of the camera 12 and is being tracked.

If, after comparing the nominal coordinates and the actual coordinates of the projectile positions, it is determined that the discrepancy between same is so great that no hit can be scored, the necessary correction signal is computed and generated in unit 21 and then coded and transmitted to the projectile by the transmitter 30.

The transmitter 30 for transmitting the correction signal may be, for example, a laser coupled to the camera. However, a conventional high frequency radio transmitter operating in the gigahertz range is also suitable for the transmitter 30. Of course the particular receiver 31 utilized will depend on the particular transmitter 30 which is utilized.

If the projectile, for example, has only one device to actuate a uniform pulse, e.g., an undosageable transverse thrust, for providing a flight path correction, the correction signal which is generated need contain only the time for actuation and the direction of the path correction. If more complicated path correction devices are available, the correction signal may contain correspondingly more information.

Since the projectile itself generally exhibits a certain amount of twist during flight and the apparatus for actuating a transverse thrust is fixedly mounted on the projectile, the projectile must first take on the correct rotational position before the transverse thrust can be actuated. Accordingly, as shown, a roll position sensor 41 is provided which activates the actuation logic circuit 40 and switches the received signal, which has been locked in by the actuation logic, to the setting member 42 to effect the path correction.

Figure 3:
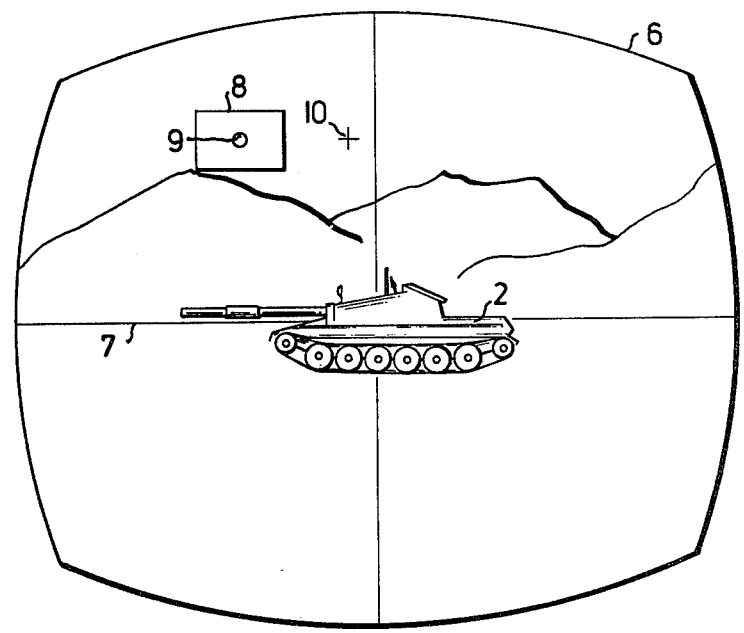
FIG. 3 is a schematic illustration of the representation on a monitor during a phase of flight of the projectile.

Turning now to FIG. 3 there is shown a possible display 6 for the monitor 14 (FIG. 2). During the flight phase the tracker 11 (FIG. 2) keeps the reticle 7 constantly on target 2. These coordinates are necessary since movement or acceleration of the target 2 are also included in the nominal path simulation. The second tracking window 8 has caught the light track 9 of the projectile while next to it the nominal position 10 of the projectile is shown for purposes of monitoring.

If completely automatic firing of the missile or projectile is not required, a single automatic tracker used only for the light track of the projectile can also be used instead of the dual tracker 11, as long as the reticle of the camera 12 is constantly held manually on the target 2. This can be accomplished in a known manner in that the gunner or operator observes the target in the monitor 14 and, in a manner known in the art, by means of a guide or joy stick 15 produces signals for the servo 13 to move the camera 12 to maintain the target 21 in the reticle 7 of the monitor and thus of the camera. The remainder of the arrangement is the same.

The dual tracker contains two so called "channels", as is explained in the leaflet AEG Sondertechnik Fernsehtracker Typ FT 77 of January, 1974 and the evaluation of the channel's results is performed per software in an included microprocessor.

Channel (a) tracks the target, i.e. the calculated deviation of the target from the crosshair (corresponding to the line of sight of the camera) is continiously fed to the servo in order to keep the camera's line of sight looking at the target. Channel (b) only follows the projectile, i.e. the calculated location of the missile is only used to permit a tracking gate or window to follow the target, and to make possible the computation of the difference between the actual and ideal locations of the missile.

The blocks 20 and 21 represent software programs which are performed by the fire control computer. A fire control system is generally known and described in the U.S. Pat. No. 3,575,085. Block 20 computes the predicted or ideal path of the projectile, as seen by the camera, based on the typical parameters of a fire control unit. Block 21 converts the difference between the actual and ideal locations of the projectile during its flight into an appropriately coded signal to be transmitted to the projectile. The code can depend on the implementation of the correction actuation and the degree of redundancy required.

Figure 4A:
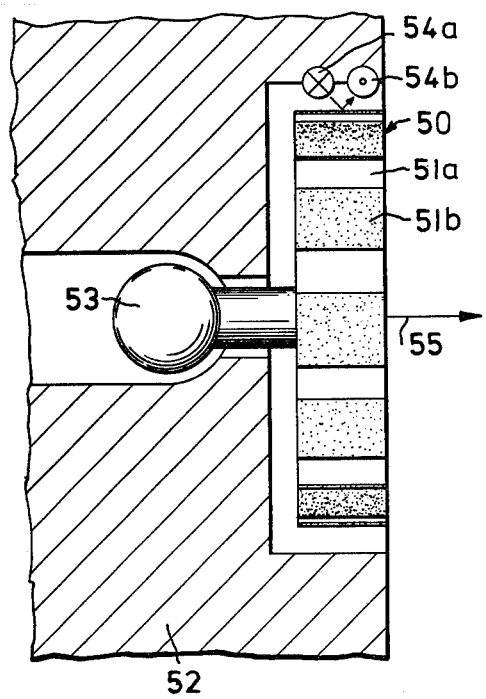
FIGS. 4a and 4b show a possible implementation of the roll position sensor.
Figure 4B:
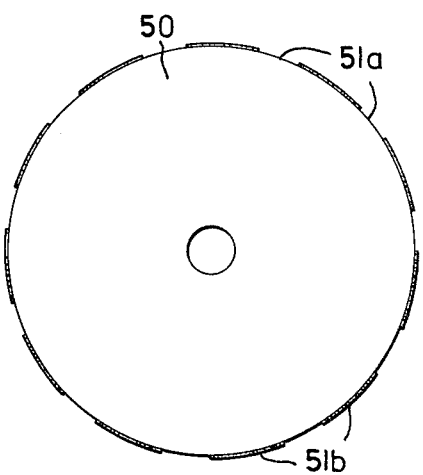

The block 41 represents a sensor that detects the angular position of the projectile, in case the projectile rotates with respect to its longitudinal axis for flight stability reasons. This may be effected by a gyro system, which represents an inertial reference. Another more rugged version would be an almost frictionless suspended mass, preferably similar to that shown at 50 in FIGS. 4a and 4b. If this mass 50 is furnished with a sequence of alternating mirror 51a and nonmirror 51b facets, the actual angular position of the projectile 52, which rotates around this mass 50, can be found by counting the mirror facets passing a reflective type light gate 54a and 54b. Reference numeral 53 shows a possible implementation of a frictionless suspension by an pneumatic bearing while 55 indicates the apparent acceleration during the flight of the projectile.

Block 40 represents an electronic logic circuit which gates the transmitted signal, i.e. sends a trigger pulse to the setting member only if the projectile is in the right angular position.

It will be understood that the above description of the present invention is susceptible to various modifications, changes and adaptations, and the same are intended to be comprehended within the meaning and range of equivalents of the appended claims.

What is claimed is:

1. A method for correcting the final phase of a ballistic projectile against stationary and moving targets by means of an externally transmitted signal comprising the steps of:

providing a dual tracking system including an optical image sensor directed at the target and two separate object evaluation circuits;

continuously tracking the location of the target to determine its actual position relative to said tracking system by continuously analyzing the scene observed by the image sensor in a first of the circuits to determine the angular coordinates of the target relative to the sighting line of the image sensor, providing a signal corresponding to said angular coordinates of the target, utilizing said signal to continuously automatically adjust the sighting line of the image sensor onto the target, and feeding the data as to the angular coordinates to a fire control computer;

simultaneously continuously tracking the position of the projectile by evaluating the scene observed by the image sensor in the other of said circuits and providing a signal corresponding to the angular coordinates of the actual position of the projectile;

utilizing said signal corresponding to the angular coordinates of said target to continuously provide a signal corresponding to the angular coordinates of the nominal position of the projectile;

continuously comparing the signal corresponding to the actual position of the projectile with that corresponding to the nominal position of the projectile to determine any deviation between the compared signals;

from said deviation, generating a correction signal, as to magnitude and direction, for the path of the projectile;

transmitting said correction signal to the projectile as a wireless coded signal; and in said projectile, translating said correction signal, together with measurements in said projectile for the dynamic flight characteristics of the projectile, into a triggering pulse for actuating the desired flight path correction for the projectile.

2. A method as defined in claim 1 further comprising monitoring the location of the target by displaying same in the reticle of a television monitor; and simultaneously monitoring the nominal and actual positions of the projectile by simultaneously displaying the momentary nominal position of the projectile, as precalculated by the fire control computer, in the television picture of the monitor in the form of a symbol, and the actual position of the projectile in the television picture of the monitor with greater picture contrast.

3. A method as defined in claim 1 wherein, the image sensor is a single tracking camera; wherein said step of tracking the target includes evaluating the scene observed by the camera in one of the evaluation circuits by pattern recognition, providing a correction signal corresponding to the deviation of the location of the target from the reticle of the camera and feeding this correction signal to a servo unit to move the camera so as to maintain the reticle of the camera on the target; and wherein said step of tracking the projectile includes analyzing the scene observed by the camera in the other of the evaluation circuits by peak contrast evaluation to provide signals corresponding to the deviation of the position of the projectile with respect to the reticle of the camera, which signals constitute the actual position of the projectile with respect to the angular coordinates.

* * * * *